INVENTOR.
THEODOR F. HUETER

Oct. 25, 1966    T. F. HUETER    3,281,769
TRANSDUCER APPARATUS
Filed June 20, 1963    4 Sheets-Sheet 3

INVENTOR.
THEODOR F. HUETER
BY
Roger W. Jensen
ATTORNEY

INVENTOR.
THEODOR F. HUETER

United States Patent Office 3,281,769
Patented Oct. 25, 1966

3,281,769
TRANSDUCER APPARATUS
Theodor F. Hueter, Seattle, Wash., assignor to Honeywell Inc., a corporation of Delaware
Filed June 20, 1963, Ser. No. 289,378
6 Claims. (Cl. 340—8)

This invention is a continuation-in-part of my prior application filed August 31, 1962, Serial No. 220,812 now abandoned, and pertains to improvements in electromechanical transducers and more particularly to an improved transducer for use at extreme depths.

The invention comprises a vibrating member having at least two surfaces and being adapted to vibrate at a particular frequency. The vibrating member is mounted at one end of a relatively rigid, free flooding, tube. The transducer, comprising the vibrating member and tube, is used in a sound conducting medium, such as the ocean, and the length of the tube corresponds to a multiple of one-quarter wave length of the frequency of the vibrating member in the sound conducting medium. When the wave length of the tube is an even multiple of one-quarter wave length, the end of the tube remote from the vibrating member is open, while when the tube is an odd multiple of one-quarter wave length, the end of the tube remote from the vibrating member is closed.

As indicated previously, the sound wave tube is free flooding and hence all surfaces of the vibrating member are under equal pressure. Therefore, the transducer is suitable for use at extreme depths.

The length (even or odd multiples of one-quarter wave length) and the boundary conditions (open end for even multiples of one-quarter wave length and closed end for odd multiples of one-quarter wave length) of the sound wave tube are selected to produce a resonant condition whereby the impedance on the inner face of the vibrating member is held to a minimum.

Without the sound wave tube the vibrating member would be nonradiating due to the fact that the radiation from the opposite faces of the vibrating member are 180° out of phase, and, since the dimensions of the vibrating member are small compared to the wave length of the sound in water, would cancel each other.

When the sound wave tube is used, the impedance on the inner face of the vibrating member is minimized thereby allowing radiation from the outer face of the vibrating member.

It is one object of this invention to provide an improved transducer.

It is another object of this invention to provide a transducer suitable for use at extreme depths.

It is a further object of this invention to provide a transducer wherein a resonant sound wave tube is used to minimize the impedance on one face of a vibrating member.

These and other objects of the invention will become apparent to those skilled in the art upon consideration of the accompanying specification, claims, and drawings of which:

Figure 1:
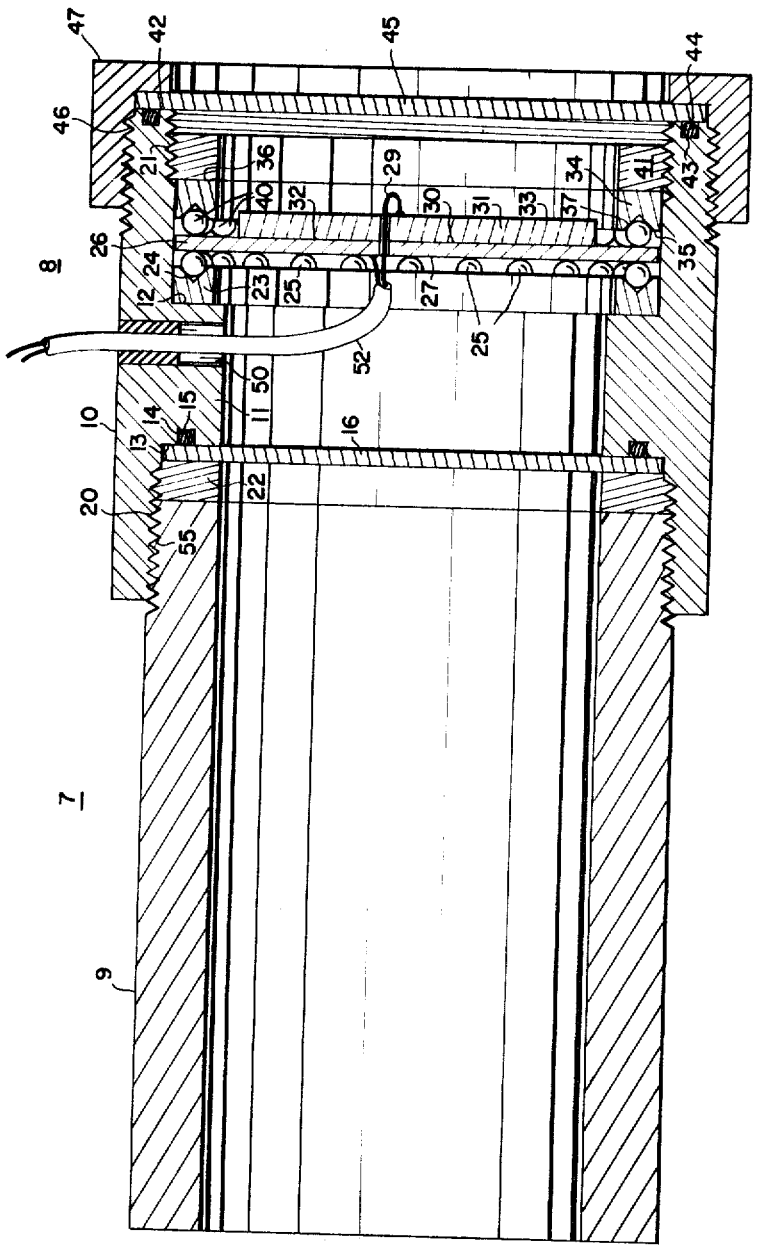
FIGURE 1 shows a cutaway view of the transducer utilizing an open end half-wave length resonant sound wave tube.

Referring to FIGURE 1 there is shown a transducer 7 comprising a vibrating member 8 and a sound wave tube 9.

Vibrating member 8 comprises a hollow cylindrical member 10, the bore of member 10 having a reduced diameter section 11 of short axial extent. Section 11 has a first shoulder 12 and a second shoulder 13.

Section 11 has a groove 14 in its shoulder 13 into which is mounted an O ring 15. O ring 15 can be made of any suitable flexible material such as rubber.

A flexible circular discs, or window, 16 is mounted in the bore of member 10 and abuts against O ring 15 and shoulder 13.

The left and right hand ends of the bore of member 10 have threaded sections 20 and 21 respectively. A locking ring 22 and the left hand threaded section 20 of the bore of member 10 are threadably engaged, locking ring 22 abutting against disc 16 so as to hold disc 16 against shoulder 13 and O ring 15.

A bearing race 23 is mounted in the bore of member 10 and abuts against shoulder 12 of section 11. The face of bearing race 23 remote from shoulder 12 has a groove 24 in which is positioned a plurality of ball bearings 25.

A flexible circular plate 26, having a first side 27 and a second side 30, is positioned in the bore of member 10, side 27 abutting against the ball bearings 25. Centrally bonded to side 30 of plate 26 is a polarized crystal 31, such as a polarized barium titanate crystal, having a first side 32 and a second side 33. Side 32 of crystal 31 is bonded to side 30 of plate 26. The diameter of crystal 31 is less than the diameter of plate 26.

A bearing race 34, having a first face 35 and a second face 36, is mounted in the bore of member 10, face 35 of race 34 having a groove 37 in which are positioned a plurality of ball bearings 40. Ball bearings 40 abut face 30 of flexing plate 26. A locking ring 41 and threaded section 21 of member 10 are threadably engaged, locking ring 41 abutting against face 36 of bearing race 34. A surface 42 of the right hand end of member 10 has an annular groove 43 therein. An annular O ring 44 of any suitable flexible material such as rubber, is positioned in groove 42 and forms a seal between member 10 and a flexible circular disc, or window 45 which abuts against O ring 44 and end surface 42.

The right hand end of the outer surface of member 10 has a threaded section 46. A cup shaped end cap 47, having a central aperture of diameter substantially the same as the bore of member 10, is threadably engaged to the threaded section 46 of member 10, end cap 47 serving to hold disc 45 firmly against O ring 44 and surface 42.

Member 10 has an aperture 50 extending from its outer surface to the inner bore, aperture 50 being partially threaded. A dual conductor energizing cable 52 passes through aperture 50 to the inner bore of member 10. One of the conductors of dual conductor cable 52 is connected to flexing plate 26, while the other conductor passes through aperture 29 in plate 26 and crystal 31 and is attached to face 33 of crystal 31. Aperture 50 is sealed by a suitable water tight sealing substance.

The inner bore of member 10 between flexing disc 16 and flexing disc 45 is filled with a suitable liquid, for example silicon oil.

Sound wave tube 9 is a hollow cylindrical member having a threaded section 55 on the outer portion of one end. Sound wave tube 9 and member 10 are threadably engaged by means of threaded sections 55 and 20 respectively. It is important that the wall of sound wave tube 9 be relatively rigid. This is necessary in order to prevent radiation from the wall of the sound wave tube. In order for the sound wave tube to radiate it would be necessary for the tube to expand and contract as a ring, hence it is the strength of the sound wave tube that is important. When the walls of the tube are relatively rigid, the radial resonant frequency is much higher than the frequency of sound in the water.

*Operation of FIGURE 1*

The operation of the transducer of FIGURE 1 is as follows: an alternating source of energizing potential (not shown) is applied through conductor 52 to crystal 31. The alternating electric field applied across crystal 31 causes the crystal to expand and contract, crystal 31 expanding when the electric field is in the same direction as the crystal polarization and contracting when the direction of the electric field is opposite to the direction of crystal polarization.

As crystal 31 expands and contracts it causes plate 26 to flex or vibrate at some particular energizing frequency. Since the silicon oil surrounding plate 22 and crystal 31 is noncompressible, the flexing of plate 31 causes discs or windows 16 and 45 to flex.

If sound wave tube 9 was not present then vibrating member 8 would act as a nonradiating dipole. An acoustic dipole is two point sources separated in space. If this separation is small compared to a wave length of sound in water, there will be no directionality to the dipole. If both sources are radiating in phase, at the same frequency, the dipole becomes merely a simple monopole source. However, if the sources are 180° out of phase, the two waves cancel and no radiation is possible. Discs 16 and 45 operate 180° out of phase with each other and, if sound wave tube 9 is not present, the waves radiated by discs 16 and 45 cancel and no radiation from vibrating member 8 occurs.

To obtain radiation from disc 45 it is necessary to hold the impedance on the outer face of disc 16 to a minimum. To accomplish this, sound wave tube 9 is utilized. The length of sound wave tube 9 corresponds to one-half wave length of the particular frequency of flexing plate 26 and crystal 31. Since sound wave tube 9 is one-half wave length long, the tube acts as a resonant cavity and hence a standing wave is produced in the tube. This system presents an impedance to the face of disc 16 that balances the system mechanically but does not radiate. The standing wave in sound wave tube 9 maintains a low pressure node at the outer face of disc 16 and pressure relief is achieved.

Figure 3:
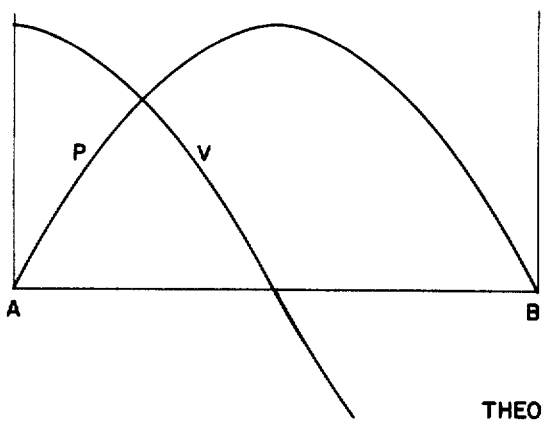
FIGURE 3 is a graphical representation of the pressure velocity curves for an open end half-wave sound wave tube.

FIGURE 3 shows the pressure and velocity graphs for the one-half wave length sound wave tube used in FIGURE 1. Point A represents the outer face of disc 16 while point B represents the open end of sound wave tube 9. Referring to FIGURE 3 it can be seen that the pressure on the outer face of disc 16 is held to a minimum and similarly the pressure at the open end of sound wave tube 9 is also at a minimum. Since the pressure on the outer face of disc 16 is minimized, no pressure differential occurs between discs 45 and 16 and hence disc 45 radiates.

Figure 2:
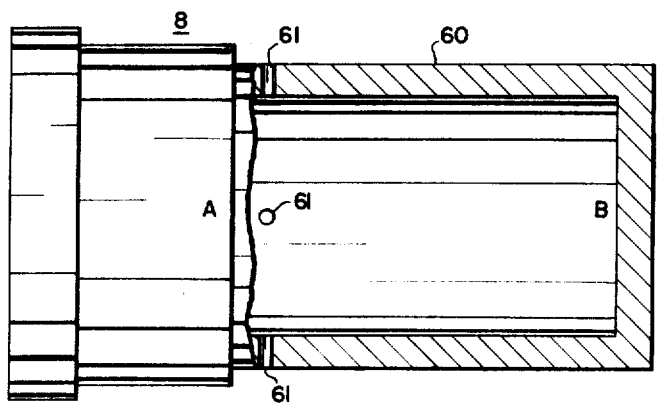
FIGURE 2 shows a cutaway view of the transducer utilizing a closed end one-quarter wave length sound wave tube.

*Structure of FIGURE 2*

FIGURE 2 shows another embodiment of the present invention. Referring to FIGURE 2 there is shown a transducer comprising a vibrating member 8 and a sound wave tube 60. Vibrating member 8 of FIGURE 2 is identical in construction to the vibrating member 8 of FIGURE 1 and hence will not be described in detail.

Sound wave tube 60 is a hollow cylindrical tube having one end threadably engaged with vibrating member 8 and the other end closed. In the end of sound wave tube 60 adjacent to vibrating member 8 are plurality of apertures 61 which extend through the shell of tube 60 and allow for free flooding of the sound wave tube when the transducer is submerged in the ocean.

The length of sound wave tube 60 corresponds to one-quarter wave length of the operating frequency of vibrating member 3.

Figure 4:
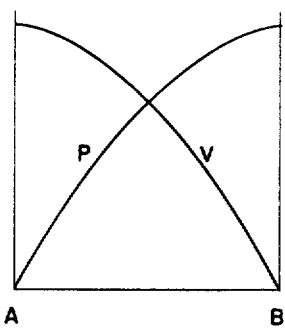
FIGURE 4 is a graphical representation of pressure and velocity wave when a quarter wave closed end sound wave tube is utilized.

The principle of operation of the transducer of FIGURE 2 is substantially the same as that described for the transducer of FIGURE 1. The radiation from vibrating member 8 sends a wave down the sound wave tube 60 which strikes the closed end of the sound wave tube and is reflected back toward the vibrating member. FIGURE 4 shows the pressure velocity graph for the transducer of FIGURE 2. Referring to FIGURE 4 it can be seen that the pressure at point A, the back portion of vibrating member 8, is at a minimum. As the wave reaches the closed end shown as surface B of sound wave tube 60 the pressure is at a maximum. The reflected wave from surface B returns to surface A at which time the wave has traveled one-half wave length, one-quarter wave length down sound wave tube 60 and one-quarter wave length at sound wave tube 60, and the pressure is again at a minimum. Thus, it can be seen that the standing wave in the resonant sound wave tube 60 holds the pressure at the back face of vibrating member 8 to a minimum and hence allows radiation from the front face of the transducer.

As was the case with the sound wave tube of FIGURE 1 it is important that the wall of the sound wave tube be relatively rigid. As was previously explained, this is necessary in order to prevent radiation from the walls of the sound wave tube. In order for the sound wave tube to radiate it would be necessary for the tube to expand and contract as a ring, hence it is the strength of the sound wave tube that is important. When the walls of the tube are relatively rigid the radial resonant frequency is much higher than the frequencies of sound in the water.

Figure 5:
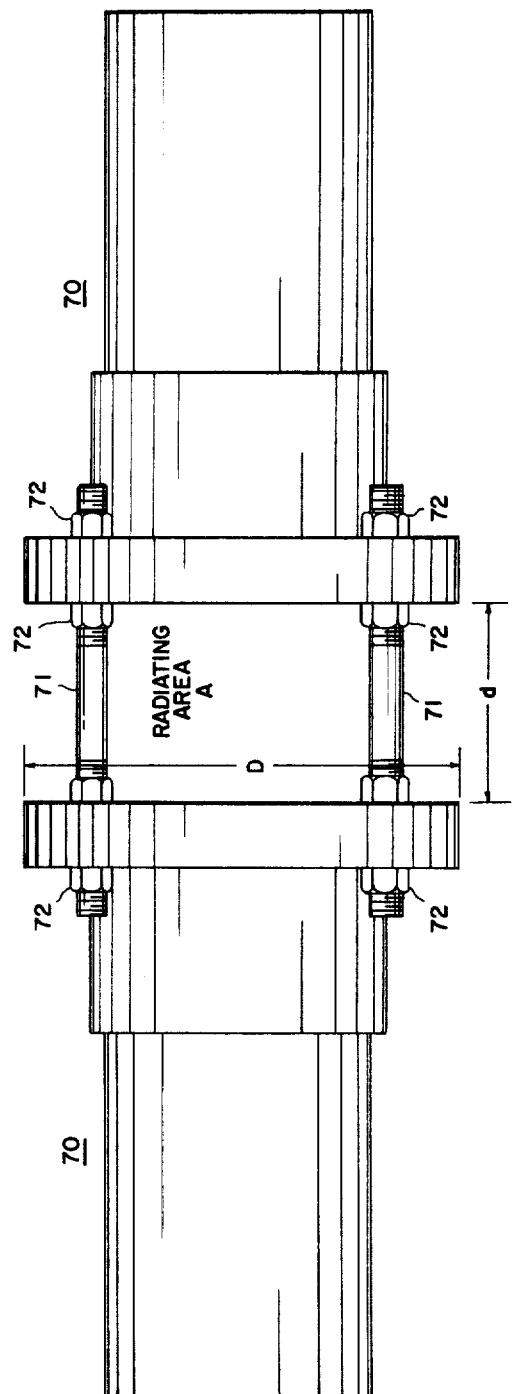
FIGURE 5 shows a representation of another embodiment of this invention utilizing two transducer elements of FIGURE 1 or FIGURE 2.

*Structure of FIGURE 5*

Referring to FIGURE 5 there is shown a pair of transducer elements 70 mounted in a face-to-face relationship by means of a plurality of mounting bolts 71 and nuts 72. Each of the transducer elements 70 are substantially identical to the transducers shown in either FIGURES 1 or 2. The distance between the faces of two transducer elements is designated by $d$, the diameter of the face of each transducer element is designated D, while the area of the radiating element of each transducer element is designated A. Mounting the transducer elements in the manner described results in increasing the radiating area of the overall transducer by a factor $D\pi d/2A$. The transducer configuration of FIGURE 5 further provides a transducer that is balanced masswise since each of the transducer elements 70 are operated in phase and any deflection of the overall transducer due to the operation of one transducer element is canceled by the operation of the other transducer element.

Figure 6:
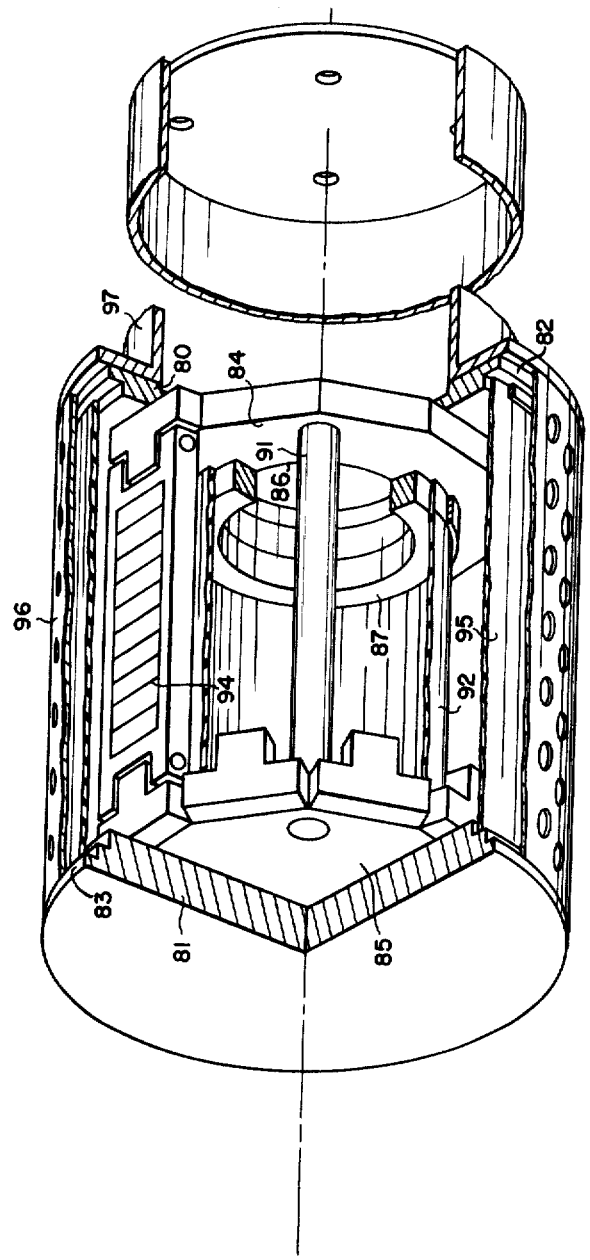
FIGURE 6 shows a representation of a further embodiment of the invention wherein the vibrating elements are mounted in a barrel-stave configuration.

*Structure of FIGURE 6*

FIGURE 6 shows a transducer comprising a first circular planar element 80 and a second circular planar element 81 each having a lip portion 82 and 83 respectively extending radially from the periphery thereof. A polyhedral planar member 84 is coaxially mounted to one surface of member 80 while a similar polyhedral planar member 85 is coaxially mounted to one surface of member 81. The diameter of elements 84 and 85 is less than the diameter of members 80 and 81. Members 80 and 84 have a circular central opening 86 therethrough. An annular ring 87 is coaxially mounted to member 84, the diameter of ring 87 being substantially less than the diameter of member 84. Similarly, an annular ring 90 (not shown) is coaxially mounted to member 85, the diameter of ring 90 being substantially less than the diameter of element 85. Members 84 and 85 are held in a coaxially aligned spaced apart relationship by means of reinforcing bars such as bar 91. A neoprene cylinder 92 is coaxially positioned between elements 84 and 85 and is attached to the periphery of annular rings 87 and 90 (not shown). A plurality of bender bar transducer elements, such as bender bar 94, are mounted between elements 84 and 85, one end of bender bar 94 being attached to a peripheral surface of polyhedral planar member 84 and the other end of bender bar 94 being attached to the corresponding peripheral surface of polyhedral planar element 85. The construction and operation of the bender bar elements are explained in a copending application by Elston et al., Serial No. 156,209, now Patent No. 3,127,527 filed December 1, 1961. A neoprene cylinder 95 is coaxially positioned between elements 80 and 81 and is attached to the periphery of member 80. A perforated cylindrical steel cover 96 is positioned coaxially between elements 80 and 81 and is attached to the periphery of the lip portions 82 and 83 of elements 80 and 81 respectively. The area between the inner surface of neoprene cylinder 95 and the outer surface of neoprene cylinder 92 is filled with a suitable liquid, for example, silicon oil. A free-flooding tube 97 is coaxially mounted to the outer face of member 80.

In operation, the bender bar elements 94 operate in phase, that is the elements move outwardly or inwardly at the same time. Thus, it can be seen that the bender elements 94 mounted on the support elements 84 and 85 act as a transducer element operating in the circumferential mode. Since the area surrounding the bender bar elements 94 is surrounded with a noncompressible liquid that is silicon oil, the vibration of the bender elements causes a flexing of the neoprene cylinders 95 and 92. The flexing of the neoprene cylinder 95 causes acoustical energy to be transmitted to the surrounding or conducting diameter, while by the flexing of medium cylinder 92 causes acoustical energy to be transmitted down the free-flooding tube 97. Free-flooding tube 97 acts as a tuned stub, and its length is chosen so that the tube and the inner portion of the neoprene cylinder 92 are resonant at the frequency of operation of the bender elements. This resonance of the sound wave tube 97 and the neoprene cylinder 92 minimizes the impedance on the inner surfaces of bender bar elements 94.

It will be obvious to those skilled in the art that many modifications of this transducer may be made without departing from the spirit of the invention. For instance, in the transducer described, the vibrating member operates at a single frequency. If it were desired to have a variable frequency transducer this could be accomplished in many ways. One way would be to use a one-quarter wave length sound wave tube which utilizes a plunger for the closed end surface B. To operate this transducer at a different frequency would merely require the changing of the plunger position so that the sound wave tube resonant frequency corresponds to one-quarter wave length of the new transducer frequency. Similarly, if a one-half wave length open end sound wave tube were desired, it would be possible to utilize a telescoping sound wave tube, the length of the tube being varied as the frequency of the transducer was varied.

While I have shown various embodiments of my invention, this is for the purpose of illustration only and it should be understood that I intend to be limited solely by the scope of the appended claims.

What is claimed is:

1. An electromechanical transducer comprising: a vibrating member having at least two surfaces and adapted to be exposed to a sound conducting medium on both of said surfaces, said vibrating member being adapted to vibrate at a particular frequency; a relatively rigid continuous outer surface and continuous inner surface tube having two open ends, the length of said tube being substantially equal to one-half wavelength of said particular frequency; and means mounting and enclosing one of said two surfaces of said vibrating member at one end of said tube, the other end of said tube being in free communication with said sound conducting medium throughout said inner surface.

2. An electromechanical transducer comprising: a vibrating member having at least two surfaces and adapted to be exposed to a sound conducting medium on both of said surfaces, said vibrating member being adapted to vibrate at a particular frequency; a relatively rigid continuous outer surface and continuous inner surface tube having two open ends, the length of said tube being substantially equal to a multiple of one-half wavelength of said particular frequency; and means mounting and enclosing one of said two surfaces of said vibrating member at one end of said tube, the other end of said tube being in free communication with said sound conducting medium throughout said inner surface.

3. An electromechanical transducer comprising: a hollow cylindrical vibrating element having an inner surface and an outer surface and having an axial opening in one end thereof; a relatively rigid free flooding tube; and means mounting said free flooding tube at said one end of the vibrating element and positoned to enclosed said axial opening therein, said free flooding tube resonating in response to the vibrations of said vibrating element and minimizing the impedance on the inner surface of said cylindrical vibrating element.

4. An electromechanical transducer comprising: a first transducer element comprising in combination a vibrating member having first and second opposed faces and in communication with a sound conducting medium on both of said faces, said vibrating member being adapted to vibrate at a particular frequency, a relatively rigid free flooding tube having a continous outer surface and containing at least one opening for flooding said tube with said sound conducting medium, the length of said tube being substantially equal to one-quarter wavelength of said particular frequency, means mounting said vibrating member at a first end of said tube, and means closing the other end of said tube; a second transducer element substantially identical to said first transducer element; and means mounting first ends of said first and said second tranducer elements in a face-to-face aligned, spaced apart relationship.

5. An electromechanical transducer comprising: a first and a second transducer element each comprising in combination a vibrating member having first and second opposed faces exposed to and in communication with a sound conducting medium on both of said faces, said vibrating member being adapted to vibrate at a particular frequency, a relatively rigid free flooding tube having a continuous outer surface and containing at least one opening for flooding said tube with said sound conducting medium, the length of said tube being a multiple of one-quarter wavelength of said particular frequency; and means mounting said vibrating member at a first end of said tube; and means mounting first ends of said transducer elements in a face-to-face spaced apart relationship.

6. An electromechanical transducer comprising: a hollow cylindrical vibrating element having an inner surface and an outer surface and having an axial opening in one end thereof; a relatively rigid free flooding tube; and means mounting said free flooding tube at said one end of said vibrating element, the vibrating element and said free flooding tube coacting to form a one-quarter wavelength tuned stub which functions to minimize the impedance on the inner surface of said vibrating element.

References Cited by the Examiner

UNITED STATES PATENTS

| | | | |
|---|---|---|---|
| 2,406,767 | 10/1932 | Hayes | 340—10 |
| 2,411,541 | 11/1946 | Hayes | 340—8 |
| 2,746,026 | 5/1956 | Camp | 340—8 |
| 2,880,404 | 3/1959 | Harris | 340—11 |
| 2,891,232 | 6/1959 | Benecke | 340—9 |
| 2,961,636 | 11/1960 | Benecke | 340—9 |
| 3,127,527 | 3/1964 | Elston | 340—10 |

CHESTER L. JUSTUS, *Primary Examiner.*

G. M. FISHER, *Assistant Examiner.*